United States Patent [19]

Moriyama

[11] Patent Number: 5,160,834
[45] Date of Patent: Nov. 3, 1992

[54] MULTIDIRECTIONAL DIVIDED-PUPIL FOCUS DETECTING APPARATUS

[75] Inventor: Keiji Moriyama, Yokohama, Japan
[73] Assignee: Nikon Corporation, Tokyo, Japan
[21] Appl. No.: 617,761
[22] Filed: Nov. 26, 1990

[30] Foreign Application Priority Data

Dec. 1, 1989 [JP] Japan .................................. 1-312675

[51] Int. Cl.⁵ ........................... G01J 1/20; G03B 3/00
[52] U.S. Cl. .................................. 250/201.8; 354/408
[58] Field of Search ............................. 250/201.8, 204; 354/406, 407, 408

[56] References Cited

U.S. PATENT DOCUMENTS

| | | | |
|---|---|---|---|
| 4,699,493 | 10/1987 | Koyama et al. .................... | 250/201.8 |
| 4,859,842 | 8/1989 | Suda et al. ......................... | 250/201.8 |
| 4,967,226 | 10/1990 | Kuwata ............................... | 354/406 |
| 4,992,819 | 2/1991 | Ohtaka et al. ..................... | 354/408 |

FOREIGN PATENT DOCUMENTS

| | | |
|---|---|---|
| 62-95511 | 5/1987 | Japan . |
| 63-11906 | 1/1988 | Japan . |
| 63-88511 | 4/1988 | Japan . |
| 1-251008 | 10/1989 | Japan . |

Primary Examiner—David C. Nelms
Assistant Examiner—Michael Messinger
Attorney, Agent, or Firm—Shapiro and Shapiro

[57] ABSTRACT

A focus detecting apparatus has a condenser lens provided near a primary image of an object formed through an objective lens, and a plurality of focus detecting optical systems, each detecting deviation between the relative positions of a pair of secondary images. Each focus detecting optical system has a pair of stop openings provided rearwardly of the condenser lens for dividing a marginal area of the exit pupil of the objective lens into a pair of divided pupil areas that are symmetrically disposed with respect to the optic axis of the objective lens. A pair of re-imaging lenses is disposed rearwardly of each pair of stop openings for forming a pair of secondary images. The directions of deviation of the pairs of secondary images differ from each other. The interval between the centers of the stop openings of each pair of stop openings is substantially the same for all the pairs of stop openings, but the radii of circles that circumscribe respective pairs of stop openings differ from each other.

10 Claims, 5 Drawing Sheets

MULTIDIRECTIONAL DIVIDED-PUPIL FOCUS DETECTING APPARATUS

BACKGROUND OF THE INVENTION

1. Field of the Invention

This invention relates to a focus detecting apparatus of the T.T.L. type for effecting focus detection by light from an object passed through a photo-taking objective lens, and particularly to a focus detecting apparatus capable of effecting focus detection on the basis of light from objects in a plurality of directions.

2. Related Background Art

Heretofore, a focus detecting apparatus of this type has been designed such that rearwardly of the primary image of an object formed by a photo-taking lens, there is disposed an optical system for re-imaging two secondary images substantially similar to the primary image and the amount of deviation between the relative positions of these two secondary images, i.e., the defocus amount, is detected to thereby accomplish focus detection.

Such a focus detecting optical system is usually disposed so that the re-imaged two secondary images are arranged side by side only in a particular direction (for example, the lengthwise direction of the photographing picture plane). However, the image of the object formed by the photo-taking lens has a luminance distribution in any direction, and the prior-art focus detecting apparatus described above has suffered from the disadvantage that focus detection becomes impossible for an object which does not have a luminance distribution in a direction fit for the focus detecting optical system (for example, the lengthwise direction of the photographing picture plane).

In order to eliminate such disadvantage, there have been proposed and already known several focus detecting apparatuses in which a plurality of pairs of optical systems are disposed so that the directions of deviation between the relative positions of a pair of secondary images may differ from each other. For example, Japanese Laid-Open Patent Application No. 62-95511 discloses a focus detecting apparatus designed such that the pupil is divided symmetrically with respect to the optic axis of a photo-taking lens and a plurality of focus detecting optical systems for forming two secondary images are disposed in different directions to effect focus detection.

Also, Japanese Laid-Open Patent Application No. 63-11906 discloses a focus detecting apparatus in which the pupil is divided symmetrically with respect to an axis differing from the optic axis of a photo-taking lens and a plurality of independent focus detecting optical systems for forming secondary images are disposed, whereby focus detection is possible in a plurality of directions and at a plurality of locations.

However, in the above-described prior-art focus detecting apparatuses in which a plurality of focus detecting optical systems are disposed, a plurality of optical systems for detecting only the deviation between the relative positions of secondary images arranged side by side in one direction are merely disposed in horizontal and vertical directions. Therefore, there is obtained the advantage that as the probability with which there exists an object having a luminance distribution in a direction which is not fit for the focus detecting optical systems becomes lower, the possibility of focus detection becoming impossible becomes smaller, but there is the problem that the focus detecting apparatus becomes bulky.

On the other hand, a focus detecting apparatus which has a plurality of focus detecting optical systems disposed so that the directions of deviation between the relative positions of secondary images may differ from each other and in which the focus detecting optical systems differing in direction are endowed with different functions is also known as disclosed, for example, in Japanese Laid-Open Patent Application No. 63-88511.

This known focus detecting apparatus is designed such that the optical interval between the centers of gravity of the divided areas of the pupil on a photo-taking lens divided by the pupil dividing means of one of the focus detecting optical systems differ from the optical interval between the centers of gravity of the divided areas of the pupil on the photo-taking lens divided by the pupil dividing means of another one of the focus detecting optical systems, and the relative interval between secondary images formed through different pupil areas is changed to thereby make the amount of deviation between the relative positions of the secondary images (the resolving power) for the distance great.

However, in such a focus detecting apparatus having focus detecting optical systems differing in the relative interval between the secondary images, the coefficient for converting the amount of deviation between the relative positions of the secondary images into a defocus amount differs from one optical system to another and as a whole, calculation becomes complicated. Further, in the focus detecting optical system greater in the optical interval between the centers of gravity of the divided areas of the pupil on the objective lens, the nonuniformity of the quantity of light of the secondary images caused by aperture efficiency, i.e., the so-called eclipse, is apt to occur, and such optical system can only cope with photo-taking lenses of great aperture ratio, lacks versatility and moreover, has suffered from the problem that pupil dividing means such as a diaphragm and re-imaging lenses for forming secondary images become extremely bulky.

Furthermore, a focus detecting apparatus in which pupil dividing diaphragms and secondary image forming re-imaging lenses in a plurality of focus detecting optical systems disposed so that the directions of deviation between the relative positions of secondary images may differ from each other are made compact is disclosed, for example, in Japanese Laid-Open Patent Application No. 1-251008. Again in this known focus detecting apparatus, however, the interval between the centers of gravity of a pair of divided areas of the pupil in the longitudinal direction on the exit pupil of the objective lens is made greater than the interval between the centers of gravity of a pair of divided areas of the pupil in the lateral direction. Therefore, the coefficients for converting the amounts of deviation between the positions of the longitudinal and lateral images on the secondary image plane into a defocus amount differ from each other, and the calculation process during focus detection is complicated, and this leads to the disadvantage that high-speed focus detection becomes difficult.

SUMMARY OF THE INVENTION

The present invention has been made in view of the above-noted problems peculiar to the prior art and an object thereof is to provide a compact focus detecting apparatus of high versatility in which there are disposed a plurality of focus adjusting optical systems differing in the direction of deviation between the relative positions of secondary images.

The present invention is first directed to a focus detecting apparatus having a condenser lens provided near or rearwardly of the primary image of an object formed through an objective lens, and a plurality of focus detecting optical systems for detecting the amount of deviation between the relative positions of secondary images to thereby effect focus detection, each of said focus detecting optical systems being provided with pupil dividing means provided rearwardly of said condenser lens for dividing the pupil on the objective lens into a plurality of areas symmetrical with respect to the optic axis of the objective lens, and a plurality of re-imaging lenses disposed rearwardly of said pupil dividing means and arranged in the direction of the divided pupil and provided symmetrically with respect to the optic axis for forming secondary images, said focus detecting optical systems being provided so that the directions of deviation between the relative positions of the secondary images may differ from each other.

According to the present invention, such a focus detecting apparatus is designed such that the optical interval between the centers of light beams passing through a pair of divided pupil areas on the objective lens divided by a pair of stop openings in the pupil dividing means provided in the focus detecting optical systems is substantially equal to the optical interval between light beams passing through another pair of divided pupil areas of the focus detecting optical systems and that the radii of circumcircles (circumscribing circles) about the optic axis including the pair of divided pupil areas of each optical system differ from each other.

According to the focus detecting apparatus of the present invention provided with such a construction, the focus detecting optical systems are such that at the same distance as the distance to the main optic axis of the center of the light beam of one divided pupil area, the other divided pupil area also has the center of the light beam and therefore, coefficients for converting the amount of deviation between secondary images formed by the respective re-imaging lenses into a defocus amount become the same and the calculation process during focus detection becomes simple. The optical systems can also be made compact by disposing the pupil dividing means so that the directions of deviation between the relative positions of the secondary images formed by the re-imaging lenses may differ from each other.

Further, the radii of circumcircles about the optic axis including the pairs of divided pupil areas on the objective lens in the focus detecting optical systems are made different from each other and therefore, where for example, relative to the radius of the circumcircle including the divided pupil areas of the focus detecting optical system in the horizontal direction, the radius of the circumcircle in the newly added divided pupil area in another direction is made small, the probability with which focus detection becomes impossible due to eclipse can be reduced. That is, although in one optical system including the original pair of stop openings, focus detection has been impossible due to eclipse, focus detection can be accomplished normally in the other optical system including the newly added pair of stop openings, and focus detection which could heretofore cope only with photo-taking lenses of great aperture ratio becomes capable of coping also with photo-taking lenses of small aperture ratio and thus, versatility is improved.

Other objects, features and effects of the present invention will become fully apparent from the following detailed description of the invention taken in conjunction with the accompanying drawings.

DESCRIPTION OF THE PREFERRED EMBODIMENTS

Some embodiments of the present invention will hereinafter be described with reference to the accompanying drawings.

Figure 1:
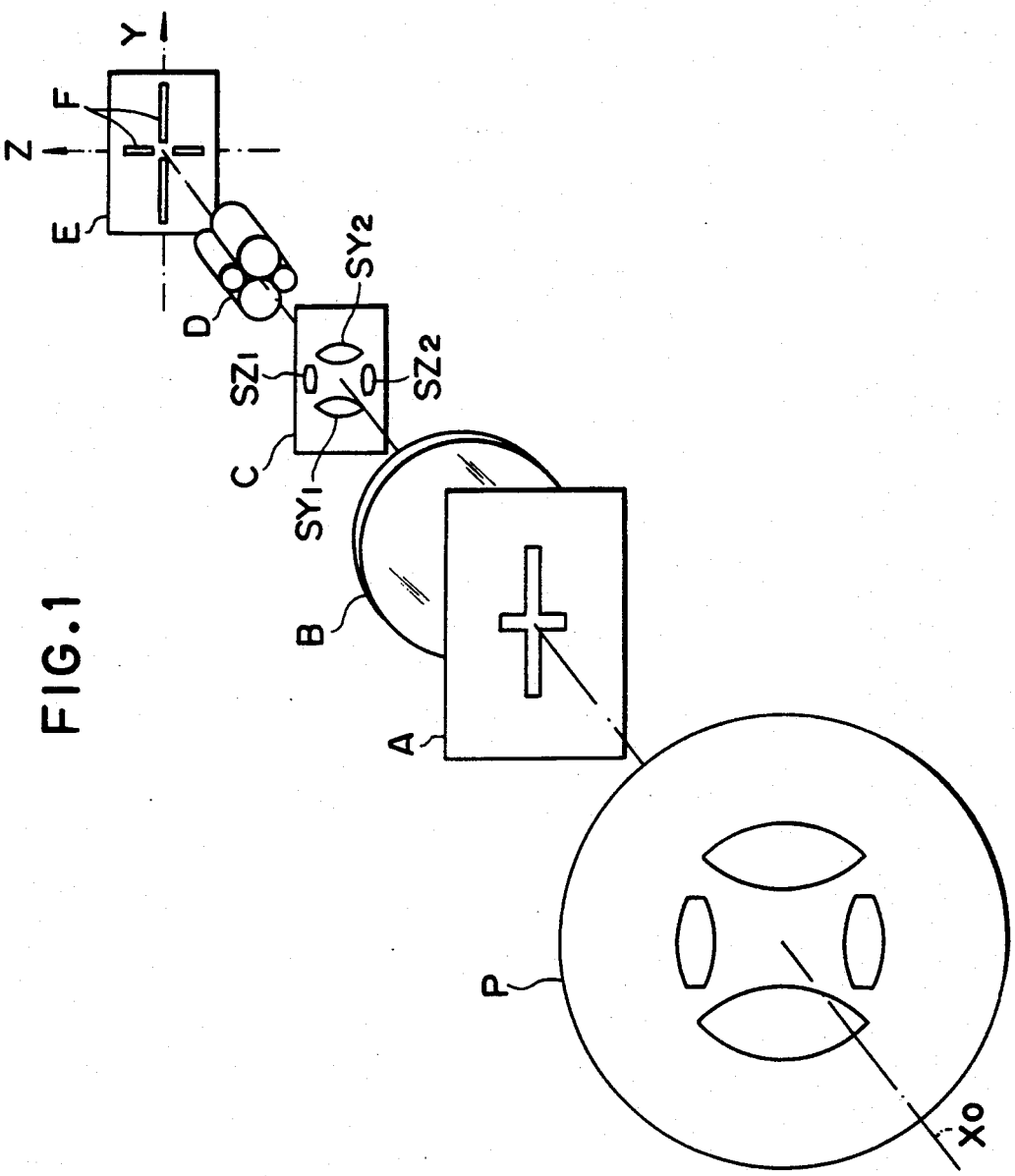
FIG. 1 is a perspective view showing the basic construction of an embodiment of the present invention.

FIG. 1 shows the basic construction of an embodiment of the present invention.

In the focus detecting optical systems shown in FIG. 1, the object image is formed on a primary image plane A through a photo-taking lens (the pupil P of which is shown), and a condenser lens B is disposed near or rearwardly of the primary image plane A. Subsequent to the condenser lens B, a stop C as pupil dividing means is provided. That is, the stop C lies at or near a position conjugate with the pupil P of the photo-taking lens with respect to the condenser lens B, and has a pair of openings, which will be described in detail later, symmetrical with respect to an optic axis Xo (hereinafter referred to as the main optic axis) in each of the horizontal direction (Y direction) corresponding to the longer sides of the primary image plane A and the vertical direction (Z direction) corresponding to the shorter sides of the primary image plane A. A re-imaging lens D is disposed rearwardly of the stop C, and this re-imaging lens D is comprised of two pairs of re-imaging lens elements disposed symmetrically with respect to the main optic axis Xo in the horizontal direction and the vertical direction, respectively, correspondingly to the pairs of openings formed in the stop C in the horizontal and vertical directions, respectively.

In order to avoid the problems of adjustment and cost during manufacture, it is desirable that the two pairs of re-imaging lens elements disposed symmetrically with respect to the main optic axis Xo be formed of the same material.

With such construction of the focus detecting optical systems, the light beam from the exit pupil P of the photo-taking lens is imaged on the primary image plane A and thereafter reaches the stop C through the condenser lens B, and is substantially divided into a light beam intercepted by the stop C and light beams passing through two areas in the horizontal direction (Y direction) and two areas in the vertical direction (Z direction) as shown in the exit pupil P of the photo-taking lens, through the openings in the stop C. Two sets of light beams passing through the stop C and forming a pair in each of the vertical and horizontal directions form a pair of secondary images in each of the vertical and horizontal directions on the image plane E by the re-imaging lens D. Accordingly, by disposing line-shaped sensors F along the directions of arrangement of the secondary images in the horizontal and vertical directions on the secondary image plane E, and photoelectrically converting the secondary images by the sensors F, the amount of deviation between the relative positions of the respective pairs of secondary images in the horizontal direction (Y direction) and the vertical direction (Z direction) can be detected and finally, focus position detection in which the detected amount of deviation is the defocus amount can be accomplished.

The principle of the non-uniformity of the quantity of light of the secondary image caused by the opening efficiency of the stop C, i.e., the so-called eclipse, will now be described specifically with reference to FIGS. 2 and 3.

In the focus detecting apparatus of a single-lens reflex camera, it is necessary that even for an interchangeable lens having a great fully open F-value of the order of F5.6, eclipse be prevented from occurring in the focus detecting optical system.

Figure 2:
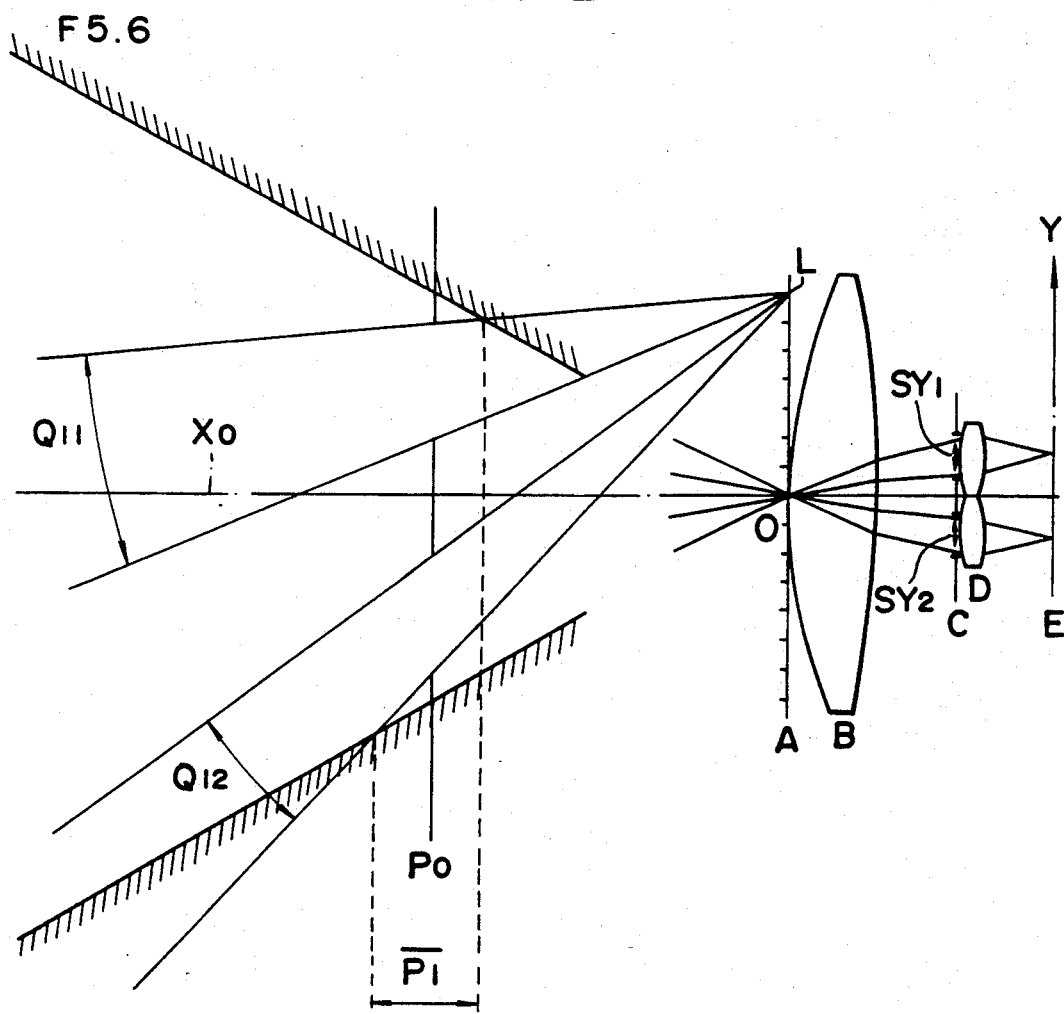
FIG. 2 illustrates the principle of occurrence of the eclipse of a light beam in the horizontal direction which reaches the primary image plane shown in FIG. 1.

In FIG. 2, among the light beams passed through the photo-taking lens and received by the line sensors F, the light beam which reaches the most marginal portion L of the distance measuring area in the substantially central portion of the primary image plane A is divided into a pair of light beams $Q_{11}$ and $Q_{12}$ passing through two areas symmetrical with respect to the main optic axis Xo at a position Po conjugate with the stop C with respect to the condenser lens B. The position Po is an imaginary exit pupil position in design, and in the case of a lens for a single-lens reflex camera, it is placed at a distance of about 100 mm from the primary image plane A toward the object side. In order that for a photo-taking lens of a fully open F-value of F5.6, eclipse may not occur in this focus detecting optical system, the actual exit pupil of the photo-taking lens must be within a range P1 in the direction of the optic axis which is the inside of F5.6 indicated by hatching in which the two light beams $Q_{11}$ and $Q_{12}$ for focus detection are not eclipsed.

Even if a plurality of such focus detecting optical systems are disposed so that the directions of division of the pupil may differ from each other, the position of the actual exit pupil of the photo-taking lens for eclipse to be prevented from occurring must be within the relatively narrow range of P1 and therefore, the photo-taking lenses which can be used are limited, and this does not lead to an improvement in the versatility as a focus detecting apparatus.

Figure 4:
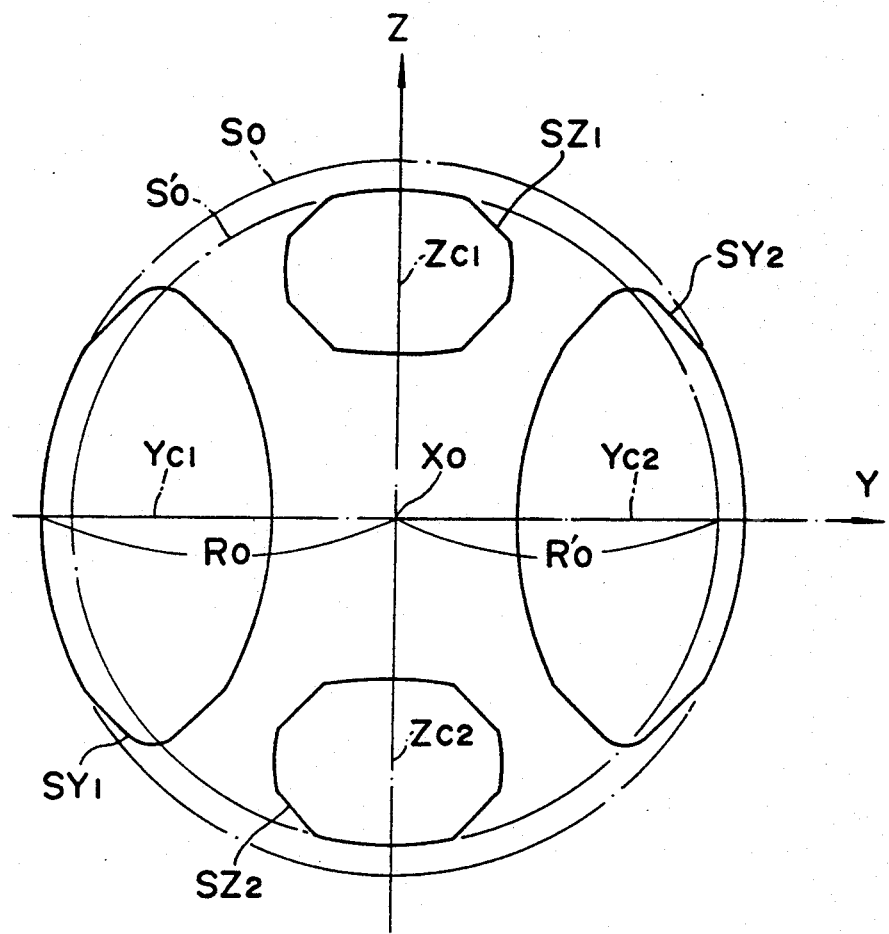
FIG. 4 is a plan view for illustrating the shape of a stop opening forming and essential portion of the present invention in FIG. 1.

So, in the present invention, the stop C for dividing the exit pupil in the horizontal direction and the vertical direction through the condenser lens B is formed into the shape as shown in FIG. 4.

That is, the centers $YC_1$ and $YC_2$ of openings (corresponding to the divided pupil areas on the pupil plane) $SY_1$ and $SY_2$ dividing the pupil in the horizontal direction and the centers $ZC_1$ and $ZC_2$ of openings $SZ_1$ and $SZ_2$ dividing the pupil in the vertical direction intersecting the horizontal direction are at an equal distance from the main optic axis Xo. Also, the radius Ro' of a circumcircle So' including the openings $SZ_1$ and $SZ_2$ for dividing the pupil in the vertical direction is smaller than the radius Ro of a circumcircle So including the $SY_1$ and $SY_2$ for dividing the pupil in the horizontal direction. The openings $SY_1$ and $SY_2$ in the horizontal direction (Y direction) are formed into substantially elliptical shapes whose major axes are substantially parallel to the Z axis and which are symmetrical with respect to the main optic axis Xo, and the openings $SZ_1$ and $SZ_2$ in the vertical direction (Z direction) are formed into substantially elliptical shapes whose major axes are substantially parallel to the Y axis and substantially equal to the end axes of the openings $SY_1$ and $SY_2$ in the horizontal direction and which are symmetrical with respect to the main optic axis Xo.

Figure 3:
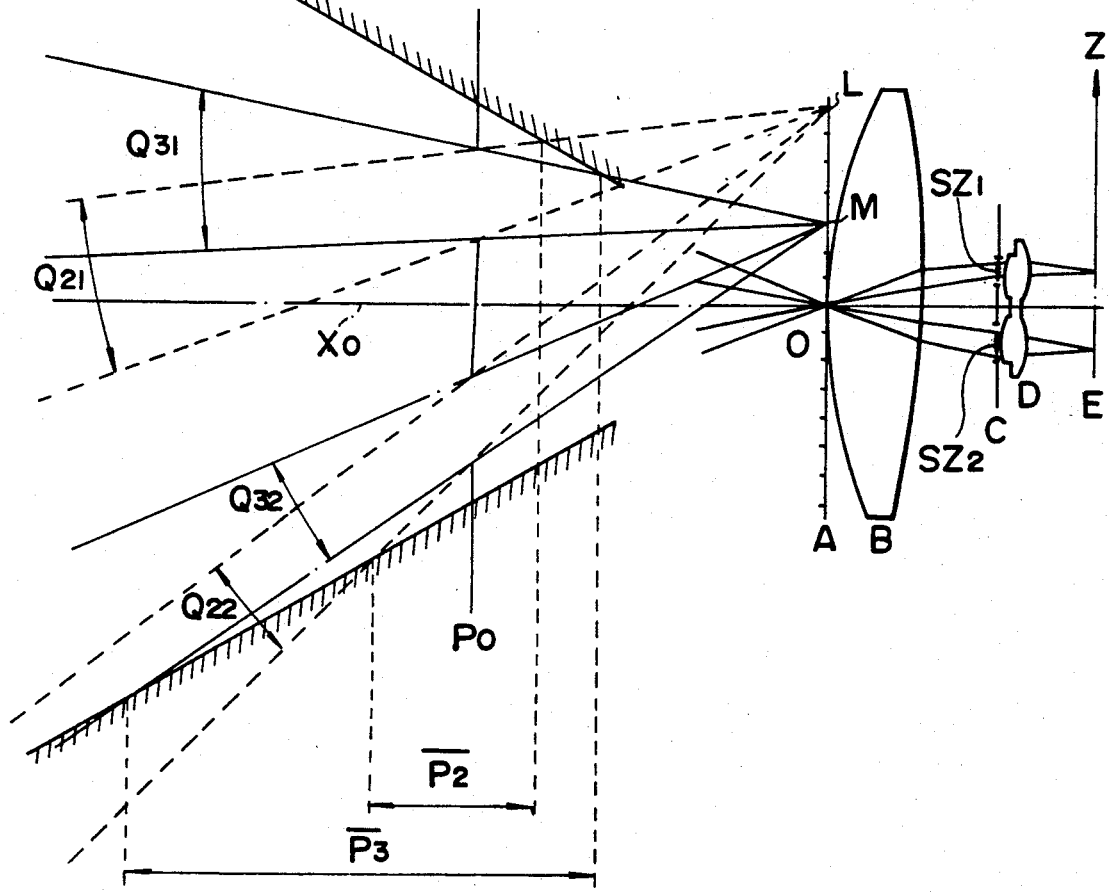
FIG. 3 illustrates the principle of occurrence of the eclipse of a light beam in the vertical direction which reaches the primary image plane shown in FIG. 1.

FIG. 3 shows a case where the outer peripheries of the openings in the stop C are made small relative to FIG. 2, and corresponds to the openings in the stop C in the vertical direction (Z direction) shown in FIG. 4.

If the outer peripheries of the openings in the stop C are thus small, the outer peripheries of two light beams $(Q_{21}, Q_{22})(Q_{31}, Q_{32})$ corresponding to the openings are limited to smaller values even at the imaginary pupil position Po in design and therefore, a range P2 in the direction of the optic axis in which the two light beams $Q_{21}$ and $Q_{22}$ for focus detection indicated by broken lines which reach the most marginal portion L of the distance measuring area are inside F5.6 indicated by hatching and are not eclipsed becomes wide as compared with the range P1 of FIG. 2, and the tolerance of the actual exit pupil position of the photo-taking lens of the fully open F-value of F5.6 becomes wider.

Further, in FIG. 4, the interval between the centers $YC_1$ and $YC_2$ of the openings $SY_1$ and $SY_2$, respectively, in the horizontal direction (Y direction) is the same as the interval between the centers $ZC_1$ and $ZC_2$ of the openings $SZ_1$ and $SZ_2$, respectively, in the vertical direction (Z direction) and therefore, the optical intervals between the centers of light beams (the light beam centers) passing through the pupil dividing areas dividing the pupil in the horizontal direction and the vertical direction are the same. Thus, the angle of opening of the light beam center of the light beams $Q_{11}$ and $Q_{12}$ in the horizontal direction in FIG. 2 becomes the same as the angle of opening of the light beam center of the light beams $Q_{21}$ and $Q_{22}$ in the vertical direction in FIG. 3, and coefficients for converting the amount of the deviation between the positions of the pair of images in each of the horizontal direction and the vertical direction on the secondary image plane E into a defocus amount can be made the same and accordingly, the complication of the calculation process during focus detection can be avoided to thereby speed up focus detection.

Also, the light beams $Q_{21}$ and $Q_{22}$ in the vertical direction passing through the divided pupil areas $SZ_1$ and $SZ_2$ become thin and therefore, the area between the two light beams on the pupil which is not concerned in focus detection becomes large, and it becomes possible to cope with a mirror lens (a reflex lens) such as a reflection telephoto lens which has heretofore encountered a difficulty in fitting a focus detecting apparatus because eclipse occurs around the main optic axis Xo. Moreover, the light beams $Q_{11}$ and $Q_{12}$ in the horizontal direction maintain substantially the same thickness as in the conventional T.T.L. type focus detecting optical system and therefore, during the focus detection in the ordinary interchangeable lens, the quantity of light on the secondary image plane E is not reduced and the deterioration of the focus detecting ability for objects of low luminance is avoided.

Figure 5:
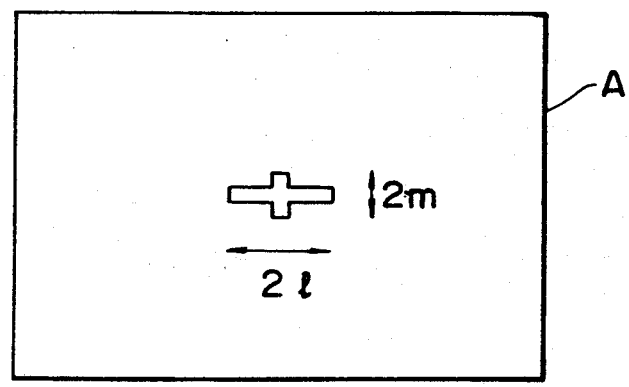
FIG. 5 illustrates distance measuring area on the primary image plane shown in FIG. 1.

Further in the present invention, the design is such that as shown in FIG. 5, the lengths of the distance measuring area in the horizontal direction and the vertical direction on the primary image plane A differ from each other. That is, in the horizontal direction corresponding to the longer side of the picture plane, the distance measuring area is made as long as 2l, and in the vertical direction corresponding to the shorter side of the picture plane, the distance measuring area is made as short as 2m.

If in this manner, the distance measuring area in the vertical direction is made short, as is apparent from FIG. 3, the range in the direction of the optic axis in which two light beams Q31 and Q32 for focus detection which reach the most marginal portion M of the short distance measuring area are not eclipsed and which is the inside of F5.6 indicated by hatching will further widen into a range P3. Accordingly, the tolerance of the actual exit pupil position of the photo-taking lens of the fully open F-value of F5.6 will further widen and focus detection will become possible without eclipse from a super-wide angle lens whose exit pupil position is considerably near to the primary image plane A to a super-telephoto lens whose exit pupil position is very far from the primary image plane A.

Also, by the distance measuring area in the vertical direction being made short, the overlap of the light beam in the horizontal direction and the light beam in the vertical direction on the secondary image side surface of the re-imaging lens D is avoided and the separation of the light beams becomes easy to accomplish and therefore, the two sets of re-imaging lens elements can be made more compact.

Thus, in a focus detecting apparatus having a focus detecting optical system in which the directions of deviation between the relative positions of secondary images are orthogonal to each other, the present invention satisfies the above-described construction and shape and thereby can remarkably improve versatility and achieve compactness.

A specific embodiment of the present invention will now be described with reference to FIGS. 6 and 7.

Figure 6:
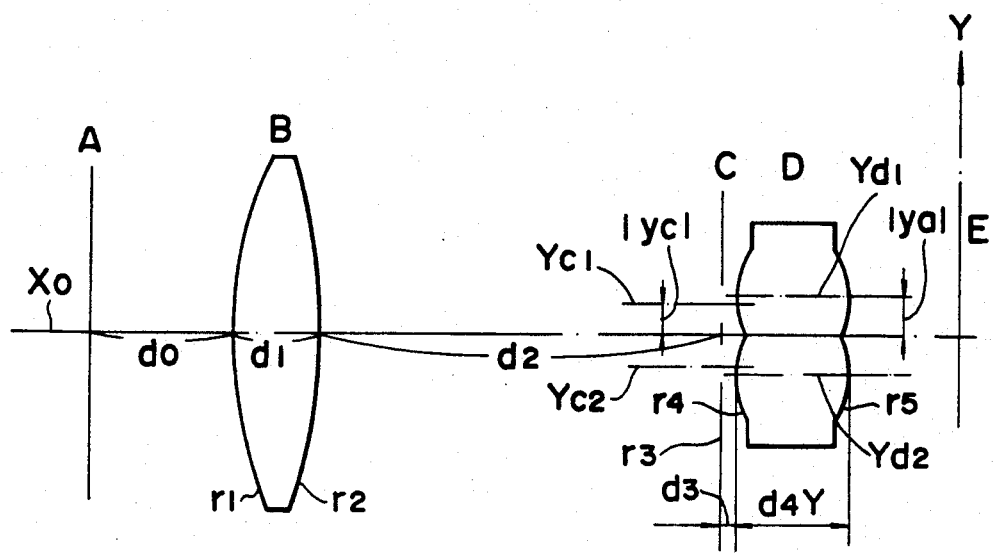
FIGS. 6 and 7 show the specific construction of an optical system according to an embodiment of the present invention, FIG. 6 being a horizontal cross-sectional view, and FIG. 7 being a vertical cross-sectional view.
Figure 7:
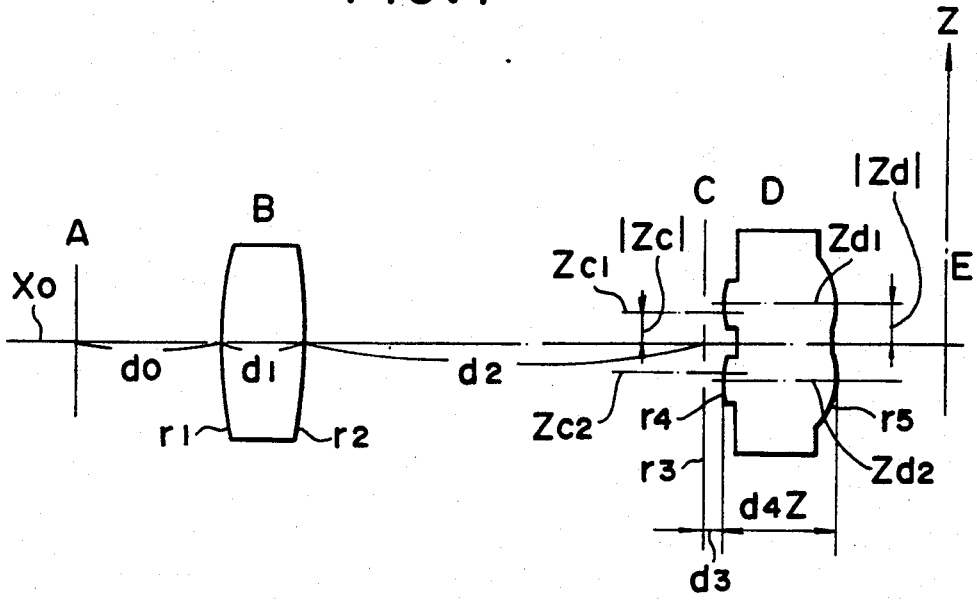

FIG. 6 shows the direction of the longer side of the photographing picture plane, i.e., a focus detecting optical system in which the deviation between the relative positions of secondary images is in the horizontal direction, and FIG. 7 shows the direction of the shorter side of the photographing picture plane, i.e., a focus detecting optical system in which the deviation between the relative positions of secondary images is in the vertical direction.

In each of these optical systems, a condenser lens B is disposed rearwardly of a primary image plane A formed by a photo-taking lens, not shown, and a stop C having a pair of stop openings symmetrical with respect to the main optic axis Xo, like the stop openings shown in FIG. 4, is disposed at or near a position conjugate with the pupil of the photo-taking lens with respect to the condenser lens B, and further, a re-imaging lens D comprising two pairs of convex lenses disposed integrally and orthogonally to each other and disposed symmetrically with respect to the main optic axis Xo so as to correspond to the respective stop openings is provided rearwardly of the stop C.

Light from an object passes through the photo-taking lens, not shown, and the shown focus detecting optical systems B–D, whereby secondary images having positional deviation in each of the vertical direction and the horizontal direction at the position of the image plane E are formed, and the secondary images are photoelectrically converted by a line sensor such as a CCD disposed near the secondary image plane E, whereby the amount of deviation between the relative positions of the secondary images in the respective directions is detected to thereby accomplish focus position detection.

Here, in both of first and second embodiments of which the numerical values will be shown later, the secondary image side surface of the condenser lens B is formed into an aspherical shape to thereby achieve the stabilization of the distribution of quantity of light reaching the line sensors on which the secondary images are formed.

Also, generally, if an attempt is made to enlarge the distance measuring area, the ends of two (a pair of) secondary images formed on the line sensors F provided at the position of the image plane E which are adjacent to the main optic axis Xo will go beyond the main optic axis Xo and overlap with each other and therefore, it will become impossible to obtain the effect of the enlarged distance measuring area sufficiently.

So, in the focus detecting optical system of the present invention in the horizontal direction shown in FIG. 6, in order to avoid the problem that the secondary images overlap with each other on the line sensors, the optic axes $Yd_1$ and $Yd_2$ of the respective lens elements of the re-imaging lens D are made eccentric so as to be farther from the main optic axis Xo than the center axes $Yc_1$ and $Yc_2$ of the respective openings in the stop C.

Also in the focus detecting optical system of the present invention in the vertical direction shown in FIG. 7, the optic axes $Zd_1$ and $Zd_2$ of the respective lens elements of the re-imaging lens D are made eccentric so as to be farther from the main optic axis Xo by the same distance as in the case of the horizontal direction than the center axes $Zc_1$ and $Zc_2$ of the respective openings in the stop C.

In each embodiment, in order to more efficiently accomplish the separation of the light beams in the horizontal direction and the vertical direction on the image plane E of the re-imaging lens D which is adjacent to the secondary image side and to make the re-imaging lens D more compact and unitary, the lens thickness d4Z of the re-imaging lens D of the focus detecting optical system in the vertical direction shown in FIG. 7 is made slightly smaller than the lens thickness d4Y of the re-imaging lens D of the focus detecting optical system in the horizontal direction shown in FIG. 6.

Lens data in the respective embodiments are given in Tables 1 and 2 below.

TABLE 1

(1st Embodiment)

| No. | r | d | nd | vd | |
|---|---|---|---|---|---|
| 1 | 11.276 | 2.500 | 1.53636 | 40.57 | B |
| *2 | −16.180 | 13.583 | | | |
| 3 | ∞ | 0.100 | | | C |
| 4 | 3.626 | (d4) | 1.53636 | 40.57 | D |
| *5 | −1.992 | | | | | d0=4.130
d4Y=2.600
d4Z=2.522
$|yc|=|zC|=0.740$
$|yd|=|zD|=0.797$
Ro=1.085
Ro'=0.992
2l=7.0
2m=3.0

Second Surface, Aspherical
  Conic section constant KB=1.20
  Aspherical surface coefficient
    a2=0
    a4=0.2839×10$^{-3}$
    a6=0.1183×10$^{-5}$
Fifth Surface, Aspherical
  Conic section constant KD=−0.38

TABLE 2

(2nd Embodiment)

| No. | r | d | nd | vd | |
|---|---|---|---|---|---|
| 1 | 9.076 | 4.100 | 1.49212 | 57.76 | B |
| *2 | −17.663 | 12.702 | | | |
| 3 | ∞ | 0.100 | | | C |
| 4 | 3.401 | (d4) | 1.49212 | 57.76 | D |
| *5 | −1.950 | | | | | d0=4.130
d4Y=1.700
d4Z=1.615
$|yc|=|zC|=0.740$  $|yd|=|zD|=0.800$

| Ro = 1.085 | Ro' = 0.992 |
|---|---|
| 2 l = 7.0 | 2 m = 3.0 |

Second Surface, Aspherical
  Conic section constant KB=1.20
  Aspherical surface coefficient
    a2=0
    a4=0.3887×10$^{-3}$
    a6=0.2380×10$^{-5}$ In Tables 1 and 2 above, the radius of curvature of the lens is represented as r, the spacing between the surfaces is represented as d, the refractive index for d-line ($\lambda$=587.6 nm) is represented as nd, and the Abbe number is represented as vd, and the optical system in the horizontal direction and the optical system in the vertical direction are shown as common to each other in the other points than the lens thickness d4 (d4Y, d4Z). Also, the marks * in the tables indicate the aspherical surfaces, and the condenser lens is shown as B, the stop is shown as C, and the re-imaging lens is shown as D.

Also, as regards the aspherical surface introduced into the condenser lens B, when r2 is the central radius of curvature and the conic section constant is KB and the nth-order aspherical surface coefficient is an and the height from the main optic axis in a direction orthogonal to the main optic axis is hB, the distance $\Delta$B along the main optic axis Xo from the tangential plane at the vertex of the aspherical surface to the position on the aspherical surface at the height hB is represented as $$\Delta B = \{ChB^2/(1 - \sqrt{1 - KBhB^2C^2})\} + a2hB^2 + a4hB^4 + a6hB^6,$$

where C=1/r2.

Also, the distance from the primary image plane A to the object side surface r1 of the condenser B is represented as do, the distances (absolute values) from the main optic axis Xo to the center axes $Yc_1$, $Yc_2$ and $Zc_1$, $Zc_2$ of the openings in the top C along a direction orthogonal to the main optic axis, in the focus detecting optical systems in the horizontal direction and the vertical direction, are represented as $|yc|$ and $|zc|$, the radii of the circumcircles, So and So' each including a pair of openings are represented as Ro and Ro', the distances (absolute values) from the main optic axis Xo to the optic axes $Yd_1$, $Yd_2$ and $Zd_1$, $Zd_2$ of the re-imaging lenses D along a direction orthogonal to the main optic axis are represented as $|yd|$ and $|Zd|$, the lens thickness of the re-imaging lens D in the optical system in the horizontal direction is represented as d4Y, the size of the distance measuring area on the primary image plane A is represented as 2l, the lens thickness of the re-imaging lens D in the optical system in the vertical direction is represented as d4Z, and the size of the distance measuring area on the primary image plane A is represented as 2m.

Further, in the first embodiment, an aspherical surface is also introduced into the secondary image side surface of each re-imaging lens D. As regards this aspherical surface, when r5 is the central radius of curvature and the conic section constant is KD and the height from the optic axis of each re-imaging lens in a direction orthogonal to the optic axis is hD, the distance $\Delta$D from the tangential plane at the vertex of the aspherical surface to the position of the aspherical surface at the height hD along the optic axes YD1, YD2 and ZD1, ZD2 is represented as $$\Delta D = \{C'hD^2/+1 - \sqrt{1 - KDhD^2C'^2})\},$$

where C'=1/r5.

In the first and second embodiments, an infrared cut filter may be disposed between the primary image plane A and the condenser lens B.

As described above, according to the present invention, there can be realized a focus detecting apparatus of high versatility which can be made compact even if there are disposed a plurality of focus detecting optical systems differing in the direction of deviation between the relative positions of secondary images, and in which the possibility of eclipsed focus detection is avoided.

What is claimed is:

1. A focus detecting apparatus for photoelectrically detecting a plurality of pairs of secondary images formed by light beams from the same object that pass through corresponding pairs of marginal areas on an exit pupil plane of an objective lens, each pair of marginal areas being disposed symmetrically with respect to a main optic axis passing through the center of the exit pupil of the objective lens, said apparatus comprising:

a condenser lens provided near a primary image of said object formed by said objective lens;
  focus detecting optical means including pupil dividing means provided at a position substantially conjugate with the exit pupil plane of said objective lens with respect to said condenser lens and having a plurality of pairs of stop openings, each pair of stop openings dividing a marginal area of the exit pupil of said objective lens into a pair of divided pupil areas, each pair of divided pupil areas being disposed symmetrically with respect to said main optic axis, the interval between the centers of stop openings of each pair of stop openings being substantially the same for said plurality of pairs of stop openings, and the radii of circles about said main optic axis that circumscribe respective pairs of stop openings differing from each other, said focus detecting optical means further including re-imaging optical means having a plurality of pairs of imaging lenses provided rearwardly of said pupil dividing means for forming said pairs of secondary images from light beams passed through corresponding pairs of stop openings, each pair of imaging lenses being symmetrically disposed with respect to said main optic axis; and photoelectric detecting means for receiving said pairs of secondary images and detecting deviation between relative positions of the secondary images of each pair of secondary images.

2. A focus detecting apparatus according to claim 1, wherein said pupil dividing means has two pairs of stop openings, the centers of the stop openings of one of said two pairs are disposed on a line that is orthogonal to a line on which the centers of the stop openings of the other of said two pairs are disposed, the stop openings of said one of said two pairs having substantially the same shape, and the stop openings of the other of said two pairs having substantially the same shape, the stop openings of said one pair being smaller than the stop openings of said other pair.

3. A focus detecting apparatus according to claim 2, wherein the stop openings of said two pairs are substantially elliptical, and the stop openings of each of said two pairs have minor axes coincident with the line on which are disposed the centers of the same stop openings.

4. A focus detecting apparatus according to claim 2, wherein the imaging lenses are disposed eccentrically by a predetermined amount in a direction away from said main optic axis relative to the centers of the corresponding stop openings, and the imaging lenses corresponding to the smaller stop openings have a smaller lens thickness than the imaging lens corresponding to the larger stop openings.

5. A focus detecting apparatus according to claim 2, wherein said photoelectric detecting means includes two pairs of line sensors orthogonal to each other for receiving two pairs of secondary images, respectively, and the line sensors corresponding to the secondary images produced by light beams passing through the larger stop openings are longer than the line sensors corresponding to the secondary images produced by light beams passing through the smaller stop openings.

6. A focus detecting apparatus for photoelectrically detecting a plurality of pairs of object images formed by light beams from the same object that pass through corresponding pairs of marginal areas on an exit pupil plane of an objective lens, each pair of marginal areas being disposed symmetrically with respect to a main optic axis passing through the center of the exit pupil of the objective lens, said apparatus comprising:

a condenser lens provided near the image plane of a primary image of said object formed through said objective lens;

a first focus detecting optical means including first pupil dividing means provided at a plane substantially conjugate with the exit pupil plane of said objective lens with respect to said condenser lens and having a first pair of stop openings of the same shape for optically dividing a marginal area of the exit pupil into two divided pupil areas disposed symmetrically with respect to said main optic axis, and a first pair of re-imaging lenses corresponding to said first pair of stop openings, respectively, for forming a first pair of secondary images of the object, said first pair of re-imaging lenses being disposed rearwardly of the corresponding stop openings and symmetrically with respect to said main optic axis;

a second focus detecting optical means system including second pupil dividing means provided on a plane conjugate with the exit pupil of said objective lens with respect to said condenser lens and having a second pair of stop openings of the same shape for optically dividing a marginal area of said exit pupil into two divided pupil areas disposed symmetrically with respect to said optic axis, the stop openings of said second pair of stop openings being smaller than the stop openings of the first pair of stop openings, and a second pair of re-imaging lenses corresponding to said second pair of stop openings, respectively, for forming a second pair of secondary images of the object, said second pair of re-imaging lenses being disposed rearwardly of the corresponding stop openings and symmetrically with respect to said main optic axis;

the interval between centers of the first pair of stop openings being substantially equal to the interval between centers of the second pair of stop openings, a circumscribing first circle tangent to said first pair of stop openings having a radius different from that of a circumscribing second circle tangent to the second pair of stop openings; and photoelectric detecting means for receiving said pairs of secondary images and detecting deviation between relative positions of the secondary images of each pair of secondary images.

7. A focus detecting apparatus according to claim 6, wherein the centers of the stop openings of said first pair of stop openings are disposed on a line that is orthogonal to a line on which the centers of the stop openings of the second pair of stop openings are disposed, and the radius of the first circle is larger than the radius of the second circle.

8. A focus detecting apparatus according to claim 7, wherein the stop openings of said pairs of stop openings are substantially elliptical, and the stop openings of each of said pairs of stop openings have minor axes coincident with the line on which are disposed the centers of the same stop openings.

9. A focus detecting apparatus according to claim 7, wherein the re-imaging lenses are disposed eccentrically by a predetermined amount in a direction away from said main optic axis relative to the centers of the corresponding stop openings, and the re-imaging lenses corresponding to the smaller stop openings have a smaller lens thickness than the re-imaging lenses corresponding to the larger stop openings.

10. A focus detecting apparatus according to claim 7, wherein said photoelectric detecting means includes first and second pairs of line sensors orthogonal to each other for receiving said first and second pairs of secondary images, respectively, and the line sensors receiving the first pair of secondary images are longer than the line sensors receiving the second pair of secondary images.

* * * * *